United States Patent
Ballard et al.

[15] 3,694,613
[45] Sept. 26, 1972

[54] BUTT WELDING AND WORKPIECE ALIGNING APPARATUS

[72] Inventors: Paul E. Ballard, North Warren; Thomas E. Gannoe, Warren, both of Pa.

[73] Assignee: GTE Sylvania Incorporated

[22] Filed: May 14, 1971

[21] Appl. No.: 143,405

[52] U.S. Cl. .....................219/101, 219/57, 219/77, 219/161
[51] Int. Cl. ...............................................B23k 9/02
[58] Field of Search..........219/101, 103, 79, 80, 158, 219/161, 57, 58

[56] References Cited

UNITED STATES PATENTS

| | | | |
|---|---|---|---|
| 3,465,118 | 9/1969 | Senn et al. | 219/101 |
| 2,204,858 | 6/1940 | Hudson | 219/101 |
| 661,588 | 11/1980 | Rietzel | 219/101 |
| 3,532,852 | 10/1970 | Larson | 219/103 |
| 2,627,009 | 1/1953 | Corson et al. | 219/101 X |

Primary Examiner—J. V. Truhe
Assistant Examiner—L. A. Schutzman
Attorney—Norman J. O'Malley, Donald R. Castle and William H. McNeill

[57] ABSTRACT

An apparatus for producing a butt weld between two pieces of longitudinally aligned material through the agency of supplying a first piece of material to one side of a stop member, whereupon it is rigidly retained by a stationary first clamping means. A second piece of material is fed to another side of the stop member, where it is rigidly retained by a movable second clamping means. The stop member is then withdrawn and a slide member, propelled by a cam actuated linkage assembly and affixed to the second clamping means, moves this means with the second piece intact toward the first piece of material, until the two pieces contact. Current is then supplied to the two pieces to effect a butt weld whereafter both clamping means release their grip on the respective pieces, allowing an extractor to move forward and eject the welded article.

13 Claims, 23 Drawing Figures

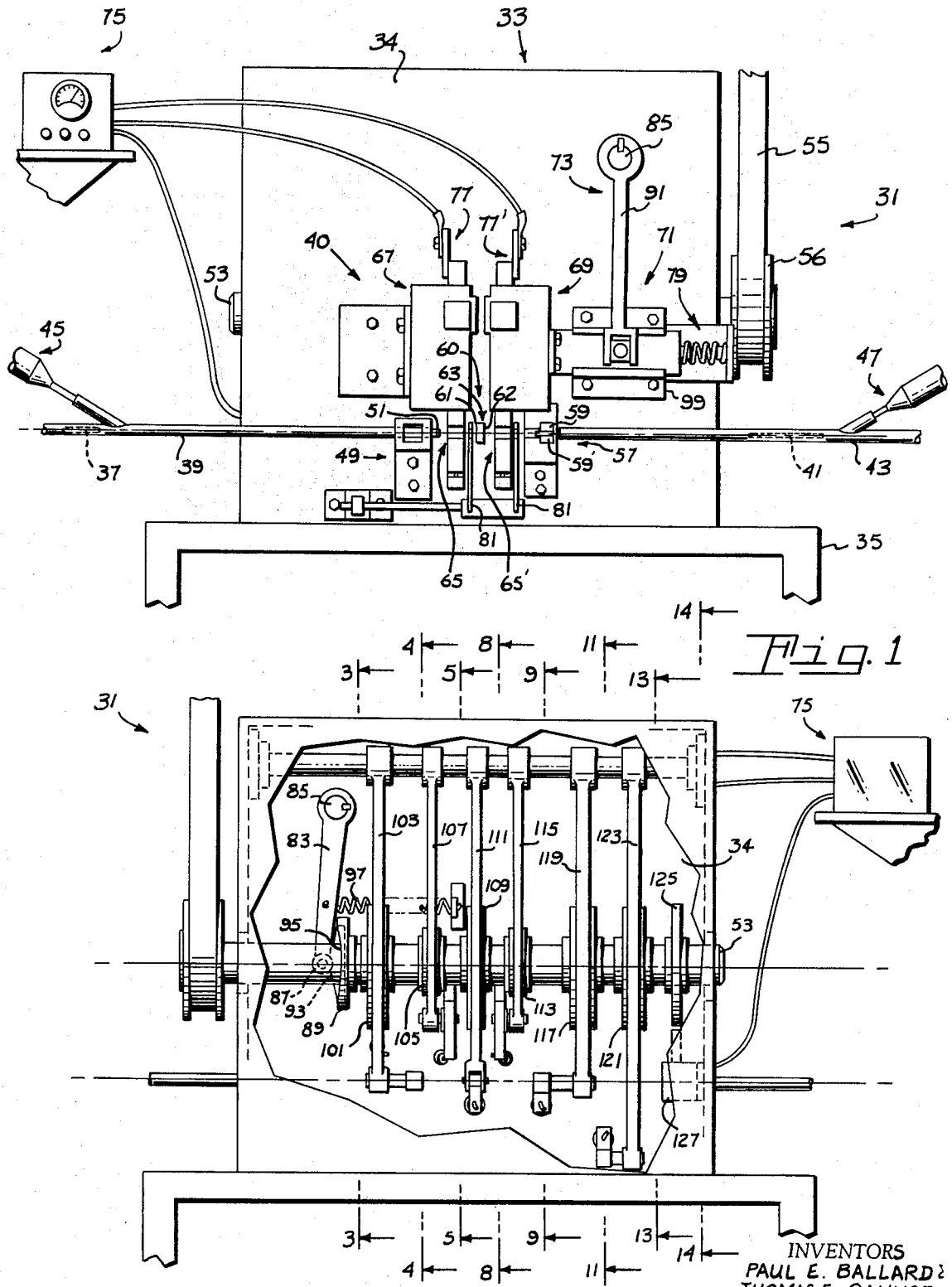

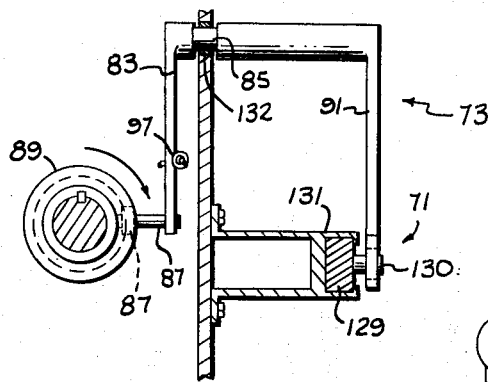
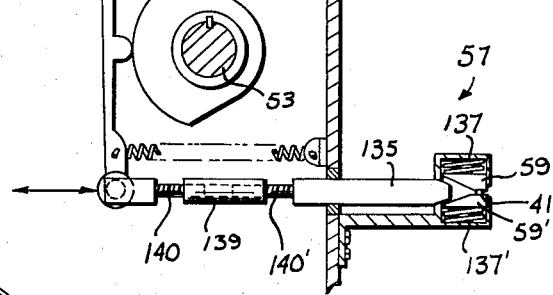
Fig. 3
Fig. 4
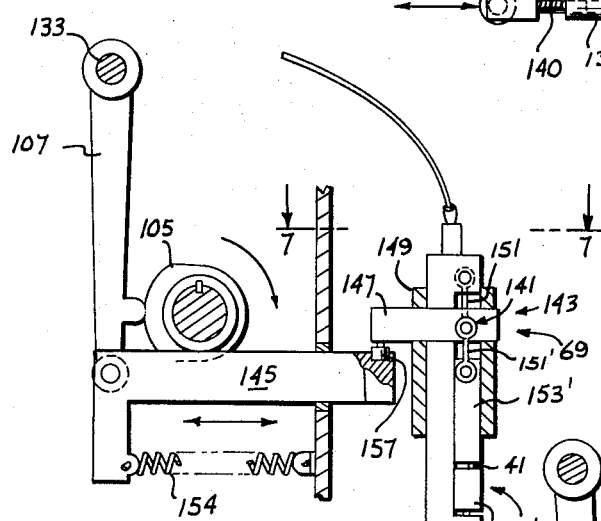
Fig. 5
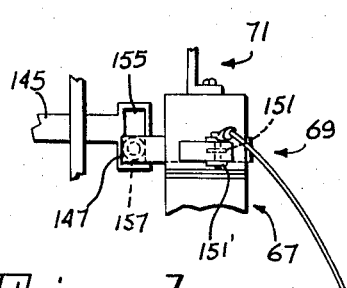
Fig. 7
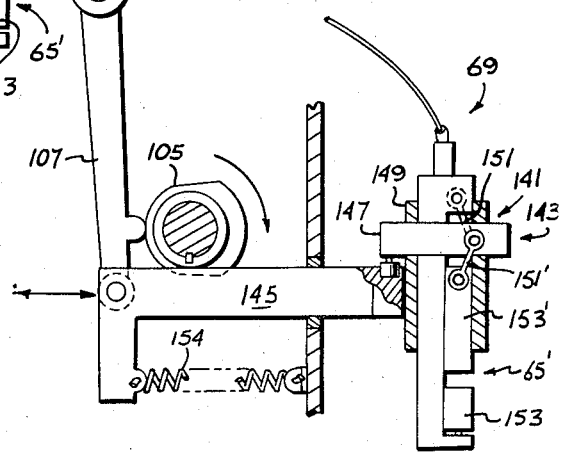
Fig. 6

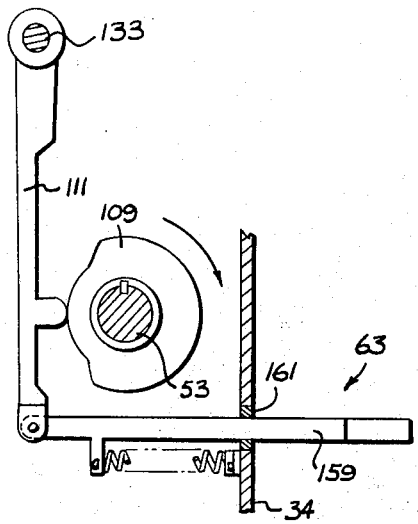
Fig. 8
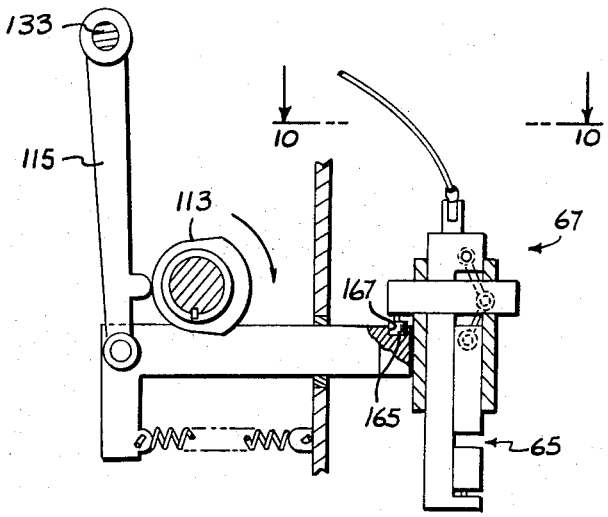
Fig. 9
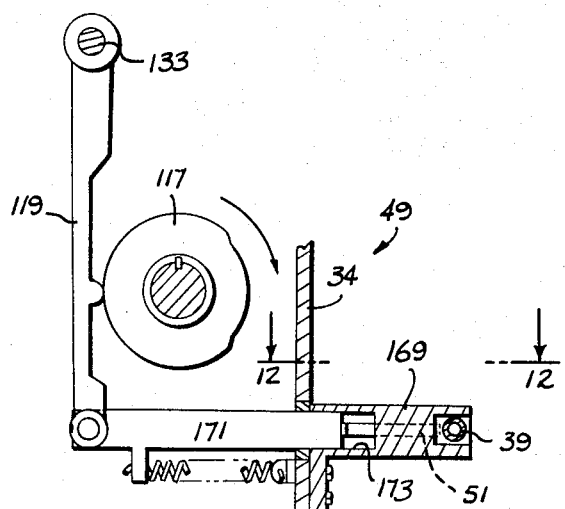
Fig. 11
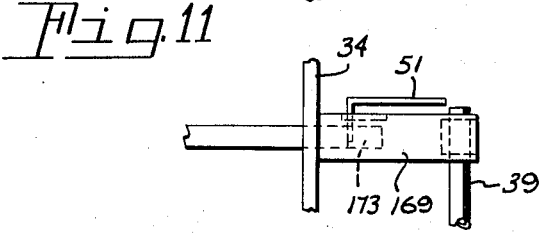
Fig. 12
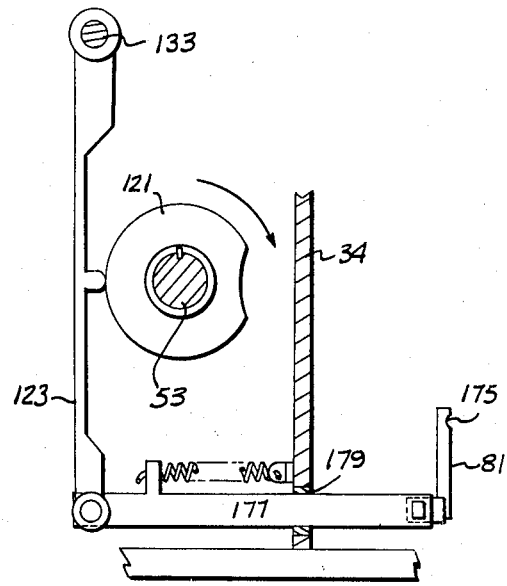
Fig. 10
Fig. 13

INVENTORS
PAUL E. BALLARD &
THOMAS E. GANNOE
BY
Donald R. Castle
ATTORNEY

BUTT WELDING AND WORKPIECE ALIGNING APPARATUS

BACKGROUND OF THE INVENTION

This invention relates to welding apparatus and more specifically to an apparatus for effecting a butt weld between two pieces of longitudinally aligned material employing resistance welding.

Butt welding two pieces of longitudinally aligned materials utilizing resistance welding techniques is quite common to those versed in the art. In the past, however, extreme difficulty has arisen in the proper aligning of these pieces to effect such a weld. In most cases, it has been necessary for an individual operator to control the final movements of any machinery attempting to accomplish this task. The two pieces are fed, usually horizontally, from opposing directions, to a common weld station, where the operator manually excites the clamping means, maintains the alignment of the pieces, and triggers the current supply. Because of the human element involved, the possibility of misjudgment resulting in an incorrect aligning of the pieces, as well as an improper bonding, is present. There is also the factor of possible injury to the operator as a result of the presence of a high power source.

It is believed, therefore, that a fully automated welding apparatus designed to effect a butt weld between two pieces of longitudinally aligned material and employing resistance welding techniques would be an advancement in the art.

OBJECTS AND SUMMARY OF THE INVENTION

Consequently, it is a primary objective of this invention to provide an apparatus for bonding together two pieces of longitudinally aligned material.

It is a further object of this invention to provide an apparatus for butt welding two pieces of longitudinally aligned material employing resistance welding techniques.

It is a still further object of this invention to provide an apparatus for welding these two pieces without the need for an individual operator to be present.

In accordance with one aspect of this invention there is provided an apparatus having a stationary first clamping means and a movable second clamping means. Positioned between these two clamping means is a movable stop member. A first piece of longitudinally aligned material is fed in from one side of the apparatus until it strikes one side of the stop. A cam actuated lockout mechanism moves to prevent additional pieces from entering this area as the first clamping means closes to retain the first piece in rigid alignment. During this same period of time, a second piece of longitudinally aligned material is being fed to the other side of the stop. And, in like manner to the operation on the other side, the second clamping means closes and retains the second piece shortly after a lockout member has restricted any additional second pieces from passing. The stop is then removed and a slide member, attached to the second clamping means, is driven forward by a cam actuated linkage assembly until the two pieces contact. Current is supplied and the weld occurs. During this type of welding operation, it is common for the excessive heat which occurs at the welding point to melt down some of the material of both pieces. To compensate for this and to assure that a sound weld is accomplished, a spring mechanism attached to the slide member provides continual lateral pressure against the slide, which in turn pushes the second clamping means toward the direction of the weld. This movement, though very small, assures that as some material is lost during the welding operation, the second piece is continually pushed forward, providing the necessary amount of additional material. After the prescribed time interval for the weld has occurred, the clamping means respectively release their grips, an extractor moves forward, and the welded article is ejected from the apparatus and collected in a pre-established collection bin.

BRIEF DESCRIPTION OF THE DRAWINGS

FIG. 1 is a front elevational view of the present invention.

FIG. 2 is a rear elevational view of the present invention.

FIG. 3 is a side elevational view of the slide member and cam actuated linkage assembly of the present invention as taken along the line 3—3 in FIG. 2.

FIG. 4 is a side elevational view of the lockout member of the present invention as taken along the line 4—4 in FIG. 2.

FIG. 5 is a side elevational view of the second clamping means of the present invention as taken along the line 5—5 in FIG. 2, showing the upper and lower jaws closed.

FIG. 6 is a side elevational view of the second clamping means showing the upper and lower jaws open.

FIG. 7 is a plan view of the second clamping means of the present invention as taken along the line 7—7 in FIG. 5.

FIG. 8 is a side elevational view of the stop means of the present invention as taken along the line 8—8 of FIG. 2.

FIG. 9 is a side elevational view of the first clamping means of the present invention as taken along the line 9—9 in FIG. 2.

FIG. 10 is a plan view of the first clamping means as taken along the line 10—10 in FIG. 9.

FIG. 11 is a side elevational view of the lockout mechanism of the present invention as taken along the line 11—11 in FIG. 2.

FIG. 12 is a plan view of the lockout mechanism as taken along the line 12—12 in FIG. 11.

FIG. 13 is a side elevational view of the ejector of the present invention as taken along the line 13—13 in FIG. 2.

DESCRIPTION OF THE PREFERRED EMBODIMENTS

Figure 20:
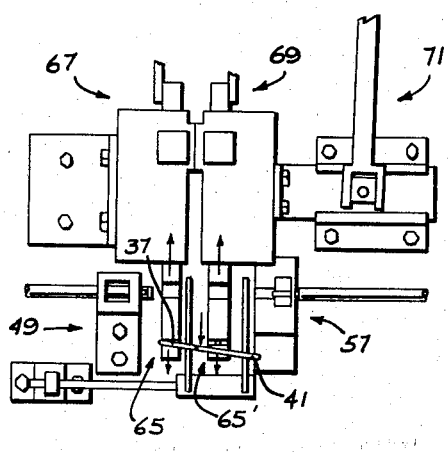
FIGS. 15–21 are front elevational views of the present invention as the pre-established sequence of movements occur to accomplish the welding operation.

For a better understanding of the present invention together with other and further objects, advantages, and capabilities thereof, reference is made to the following specification and appended claims in connection with the above-described drawings.

Referring first to FIG. 1, there is shown a front view of the present invention, apparatus 31, which comprises a casing 33 mounted on a base 35. First piece 37 is fed through tube 39 to a centrally located work station 40 while during the same time period second piece 41 is fed through tube 43 to work station 40. The means for feeding either of these pieces to their respective tubes is optional and not a dependent function of this apparatus. A typical example of one type of feed means could constitute a vibratory bowl feeder in which several similar pieces are accumulated and subjected to continuous vibrations until they channel into a single feed tube.

To assure that both pieces are kept continually moving, air injection means 45 and 47 are provided to open into tubes 39 and 43 respectively. These air injection means could be supplied by any conventional air pressure source, such as a piston-powered air compressor filling an air reservoir to which means 45 and 47 could be attached.

In addition to assuring continual travel of the pieces, the air injection means also provide constant pressure against both pieces so that they reach their designated positions within work station 40 at a rate corresponding to that of the operating cycle of the apparatus.

As first piece 37 is fed in through tube 39, it approaches lockout mechanism 49. Here, limiter arm 51, which is now in the forward position, restricts first piece 37 from any further lateral movement. The limiter arm 51, a sliding component of lockout mechanism 49, is cam actuated as are several other parts of the apparatus. The cam which actuates this arm, as well as other cams for actuating these other parts, is positioned on common rotating shaft 53, which is positioned for the most part within casing 33 and behind front wall 34. Any standard drive means can be used for rotating this shaft, one typical example being an electric motor (not shown) driving a belt 55 which in turn drives pulley 56, this being attached to one end of the shaft. A more clear explanation of the operation of these components will be given with the description of subsequent figures in the drawings.

At the same time first piece 37 is being fed into lockout mechanism 49 second piece 41 is fed into lockout member 57 where its further lateral movement is stopped by a pair of gripping jaws 59 and 59', which grasp the piece firmly. These jaws, like limiter arm 51 of lockout mechanism 49, are cam actuated by a cam positioned on common rotating shaft 53. Upon release of these jaws and withdrawal of the limiter arm, both pieces are subsequently fed into the weld area 60 wherein first piece 37 strikes side 61 of stop member 63 and second piece 41 strikes side 62. The stop member comprises a sliding rectangular shaped block which is driven by a cam actuated linkage arm (not shown). The cam for motivating this action is positioned on common shaft 53.

As both pieces strike stop member 63, lockout mechanism 49 and lockout member 57 again are actuated and restrict other pieces from entering the weld area 60.

Upon striking the stop member, the first and second pieces are gripped by the clamping jaws 65 and 65', respectively, of the first and second clamping means 67 and 69. These jaws are actuated by corresponding cams located on the common shaft.

After these pieces are retained and held in rigid alignment, stop member 63 is withdrawn and slide member 71, being propelled by a linkage assembly 73 and attached to second clamping means 69, moves this clamping means laterally until both first and second pieces contact. Linkage assembly 73, being actuated by a cam on shaft 53, only moves the second clamping means until the pieces contact. Once contact is effected, current is supplied the clamping jaws 65 and 65' by potential source 75 at points 77 and 77', respectively, to produce the butt weld.

To compensate for material melted away during the extreme heat generated between the two pieces, spring 79 provides additional lateral pressure against the slide member 71 to in turn push the second piece 41 against the first piece 37 continuously during the weld period. After the weld has been completed, the current is turned off, the clamping jaws open, and extractor arms 81 move forward and eject the assembled article from the apparatus, where it is collected in a designated receiving bin (not shown), positioned below base 35. Second clamping means 69 returns to its original position before clamping second piece 41, stop member 63 moves forward, and the cycle once again is repeated.

In FIG. 2 can be seen the back view of apparatus 31 with a portion of casing 33 cut away to show the position of shaft 53 and the respective positioning of the various cams which activate several of the working components. It must be understood that these cams and the shaft are behind front wall 34 of casing 33, and therefore cause movements to occur by acting through designated openings in this wall.

Lever arm 83, a component of linkage assembly 73, is attached at one end to axle 85 and has a follower 87 affixed at the other end. This follower, in turn, moves according to the rises and falls on cam 89, to cause the rotation of lever arm 83. As the arm 83 moves, axle 85 is revolved, turning the front arm 91 (shown in FIG. 1) to in turn cause slide member 71 to move. Slide member 71, being attached to second clamping means 69, provides a means for moving second piece 41 toward first piece 37 during the weld operation. Cam 89 is shown to have a rise portion 93 and a fall portion 95. As shaft 53 rotates, follower 87 will eventually approach this fall portion. However, at this same period of time, both the first and second pieces have come in contact, restricting any further movement of the slide member. Thus, follower 87 becomes briefly disengaged from the surface of the cam. As the weld now occurs, the need for the second piece to continue its movement is necessary to compensate for the loss of material, as previously explained. To provide this movement, spring 79 (shown in FIG. 1) is attached to the stationary portion 99 of slide member 71 to act in conjunction with spring 97 attached on the other side of front wall 34 to lever arm 83. After completion of the weld, the rise portion 93 of the cam once again contacts the follower 87 to return the slide member to its original position (as shown in FIG. 1.)

The remaining cams and their corresponding follower arms are shown along shaft 53 in their respective positions within the apparatus. Cam 101 moves follower arm 103 to in turn actuate lockout member 57. Cam 105 moves follower arm 107 to in turn actuate second clamping means 69. Cam 109 moves follower arm 111 which actuates stop member 63 and cam 113 moves follower arm 115 to actuate first clamping means 67. Cam 117 causes the movement of follower arm 119 to effect the sliding of the limiter arm 51 of the lockout mechanism 49 and cam 121 moves follower arm 123 to cause the extractors 81 to move forward and eject the completed article and then return. A final cam 125 is provided to actuate a spring loaded microswitch 127 which controls the timing of the current supply from potential source 75. Because these cams are edge actuating, additional views of each and their respective working components are provided.

Referring to FIG. 3 there is shown a side elevational view of linkage assembly 73 as it is affixed to slide member 71. Follower 87, attached to lever arm 83 by shaft 86 is held against cam 89 by spring 97 (shown cut) as was explained in FIG. 2. This linkage provides a means for moving slide member 71 by causing axle 85 to rotate, which in turn rotates front arm 91. This front arm is connected to the slide body 129 by shaft 130 to move the body within the slide housing 131. Axle 85 is fitted within a bearing 132 in front wall 34.

In FIG. 4 lockout member 57 is shown in its withdrawn position, or, with its gripping jaws 59 and 59' closed. Opening and closing these jaws is accomplished by follower arm 103 being moved by cam 101 as the cam revolves with rotating shaft 53. The follower arm, being attached to stationary shaft 133 pivots from this position to cause separator arm 135 to move to separate gripping jaws 59 and 59', thereby releasing the retained second piece. When separator arm 135 is withdrawn, jaws 59 and 59' move together, as a result of pressure applied by compressed springs 137 and 137'. The relative position of a retained second piece 41 is shown. Because the movement of separator arm 135 is highly critical to permitting and restricting movement of pieces 41 during precise timed sequences, a means for adjusting the travel distance is provided. This basically comprises an adjustment shaft 139 which is threaded over both opposing aligned ends 140 and 140' of the separator arm. By rotating adjustment shaft 139, the arm may be lengthened or shortened.

Second clamping means 69 in FIG. 5 is shown in its relative position for retaining second piece 41. In this position, clamping jaws 65' are naturally closed, this being the result of a reciprocating linkage arrangement 141 positioned in the upper portion 143 of the clamping means. To more clearly understand this movement, reference is also made to FIG. 6. As cam 105 revolves, follower arm 107, pivoted at one end to stationary shaft 133 and connected at the other end to moving arm 145, causes arm 145 to move back and forth in a substantially horizontal direction. This in turn causes link actuator 147 to move in a corresponding manner within housing 149 of the second clamping means. As can be seen in comparing FIG. 6 to FIG. 5, this lateral movement has caused the reciprocating linkage arrangement 141 to bend, and because the upper and lower link members 151 and 151', respectively, are joined to the lower and upper sliding portions 153 and 153' respectively, of clamping jaws 65', this moves the jaws apart. Spring 154 is provided as a means to retain follower arm 107 against cam 105.

The means by which second clamping means 69 is able to move so that the retained second piece 41 will contact the first piece is shown in FIG. 7. Moving arm 145 is provided with a channel 155 at the end joining link actuator 147. In this channel slides bearing 157, this bearing being an integral part of the end portion of the actuator. Whenever slide member 71 is moved (in the direction shown) this results in movement of the bearing in channel 155.

Stop member 63, which comprises a substantially rectangular shaped sliding block 159 attached at one end to follower arm 111, is shown in FIG. 8. As cam 109 moves with shaft 53, block 159 slides back and forth within bearing 161 of front wall 34.

FIG. 9 shows first clamping means 67 with the clamping jaws 65 in the open position. Means 67 is substantially similar in operation and structure to second clamping means 69 with the exception that sliding arm 163 is not provided with a channel in which bearing 165 may slide. Instead, because first clamping means 67 is stationary, arm 163 has a single hole 167 in which bearing 165 rests. FIG. 10 more clearly shows the stationary positioning of first clamping means 67 as it has closed with second clamping means 69.

In FIG. 11 can be seen lockout mechanism 49 in the withdrawn position, that position being one in which the first pieces are allowed to pass freely. Tube 39 is clasped in upper block 169, which is fastened to front wall 34. Limiter arm 51 is moved in the direction shown by slide 171 which moves in channel 173 in the upper block. This slide is attached to follower arm 119 which in turn pivots about stationary shaft 133 as it follows cam 117. The lockout mechanism restricts movement of the first pieces through tube 39 by simply blocking this passageway with limiter arm 51.

To eject the welded article from the apparatus at the end of the operation, extractors 81 (only 1 shown) move to the forward position, as shown in FIG. 13. Grooved portion 175 of extractor 81 engages the article (not shown) as it approaches this position, the forward momentum of the extractor then causing the ejection. Intermediate arm 177, which slides in bearing 179 of front wall 34, is attached to one end of follower arm 123. The other end of the follower arm pivots about stationary shaft 133 as the arm follows cam 121, revolving with rotating shaft 53.

Figure 14:
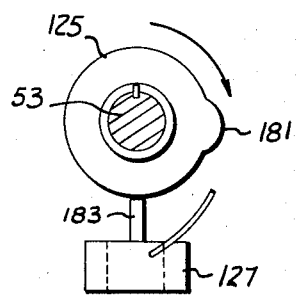
FIG. 14 is a side elevational view of the cam actuated switch mechanism of the present invention for controlling the electrical current supply to the apparatus as taken along the line 14—14 in FIG. 2.

Cam 125, in FIG. 14, revolves on common shaft 53 and has a rise portion 181 whose purpose it is to engage and depress movable actuator 183 of spring-loaded microswitch 127. When actuator 183 is depressed, microswitch 127 allows current to flow from potential source 75 (shown in FIG. 1) to the respective clamping means. As can be seen in the drawing, this occurrence is once per revolution of the common shaft 53.

Figure 15:
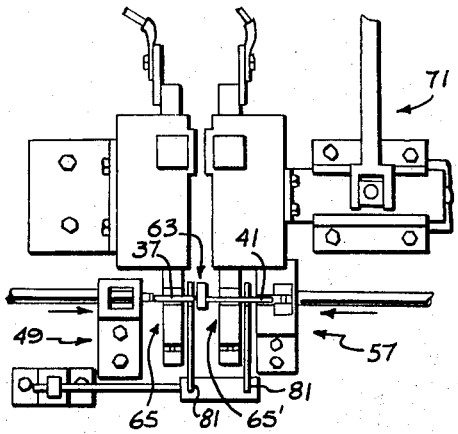

FIGS. 15–21 show in order of sequence the various movements of the previously described components as they function together to accomplish the welding operations. In FIG. 15, first and second pieces 37 and 41, respectively, have just been released by locking mechanism 49 and locking member 57, respectively, and have advanced to engage stop member 63. At this stage, slide member 71 is withdrawn, both sets of clamping jaws 65 and 65' are open, and extractors 81 are in their withdrawn position.

Figure 16:
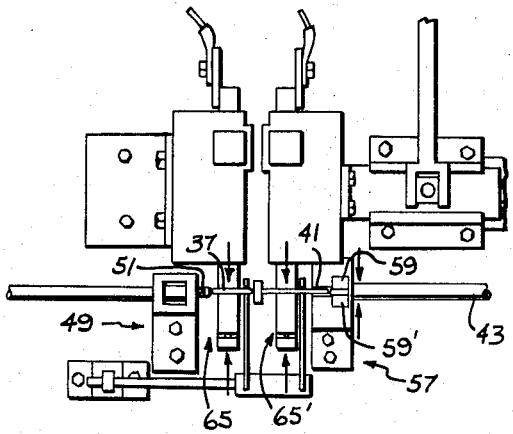

Clamping jaws 65 and 65' close in FIG. 16 to retain first piece 37 and second piece 41, respectively. During the same time interval, limiter arm 51 of lockout mechanism 49 moves forward to restrict any additional first pieces from entering the weld area, and in like manner, gripping jaws 59 and 59' close to retain the next second piece 41' and therefore prohibit it and those directly behind it in tube 43 from entering.

Figure 17:
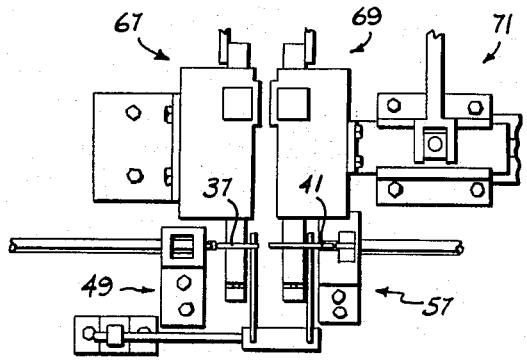
Figure 18:
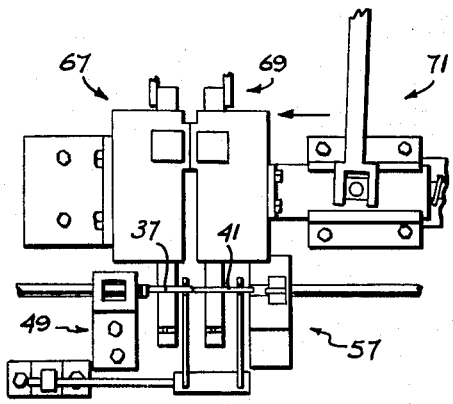
Figure 19:
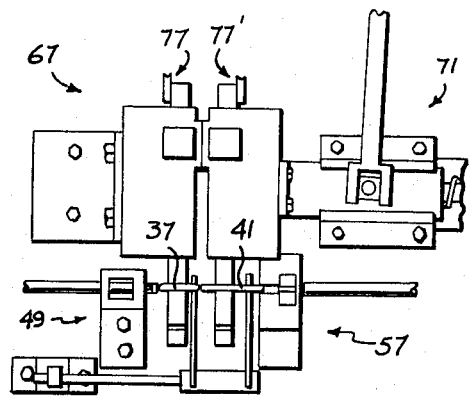

In FIG. 17, stop member 63 is withdrawn from between the two pieces and in FIG. 18, slide member 71 moves second clamping means 69 with second piece 41 firmly intact, in a lateral direction until second piece 41 and first piece 37 contact. This having been accomplished, current is next supplied to points 77 and 77' and the weld is effected. This operation occurs in FIG. 19.

Figure 21:
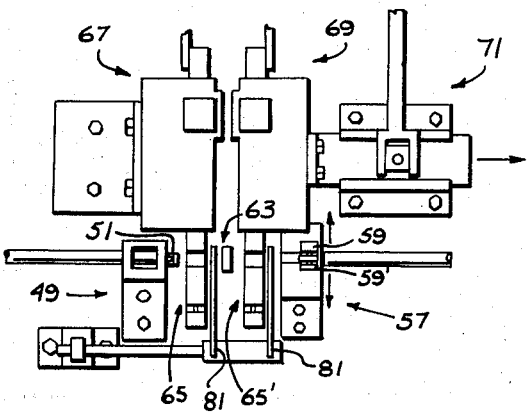

After the weld cycle is completed, clamping jaws 65 and 65' open to release the joined pieces in FIG. 20. The extractors 81 are now driven forward, releasing the joined pieces from the open jaws and causing them to drop into an established collection bin (not shown). With ejection accomplished, extractors 81 return to their withdrawn position, stop member 63 returns to its stopping position, gripping jaws 59 and 59' of lockout member 57 begin opening while limiter arm 51 of lockout mechanism 49 begins its withdrawal, and second clamping means 69 is forced back to its original position before clamping second piece 41, this movement occurring as a result of slide member 71 being drawn back, as shown in FIG. 21.

Figure 22:
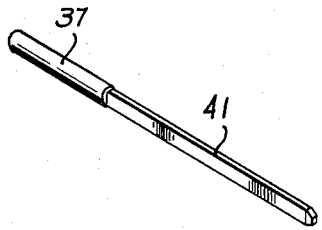
FIG. 22 is an isometric view of a completed article as produced by the present invention.

FIG. 22 shows one example of a completed article as assembled by the present invention. First piece 37 constitutes a round pin whereas second piece 41 constitutes an elongated flat pin, the two being joined together to create a contact member for use in electrical connectors. It must be remembered that this is only one example of an article which can be produced and is not a stipulation regarding shape or dimension. Actually, with only minor alterations to apparatus 31, first and second pieces 31 and 41 could have been interchanged, and fed into the apparatus from opposing directions.

Figure 23:
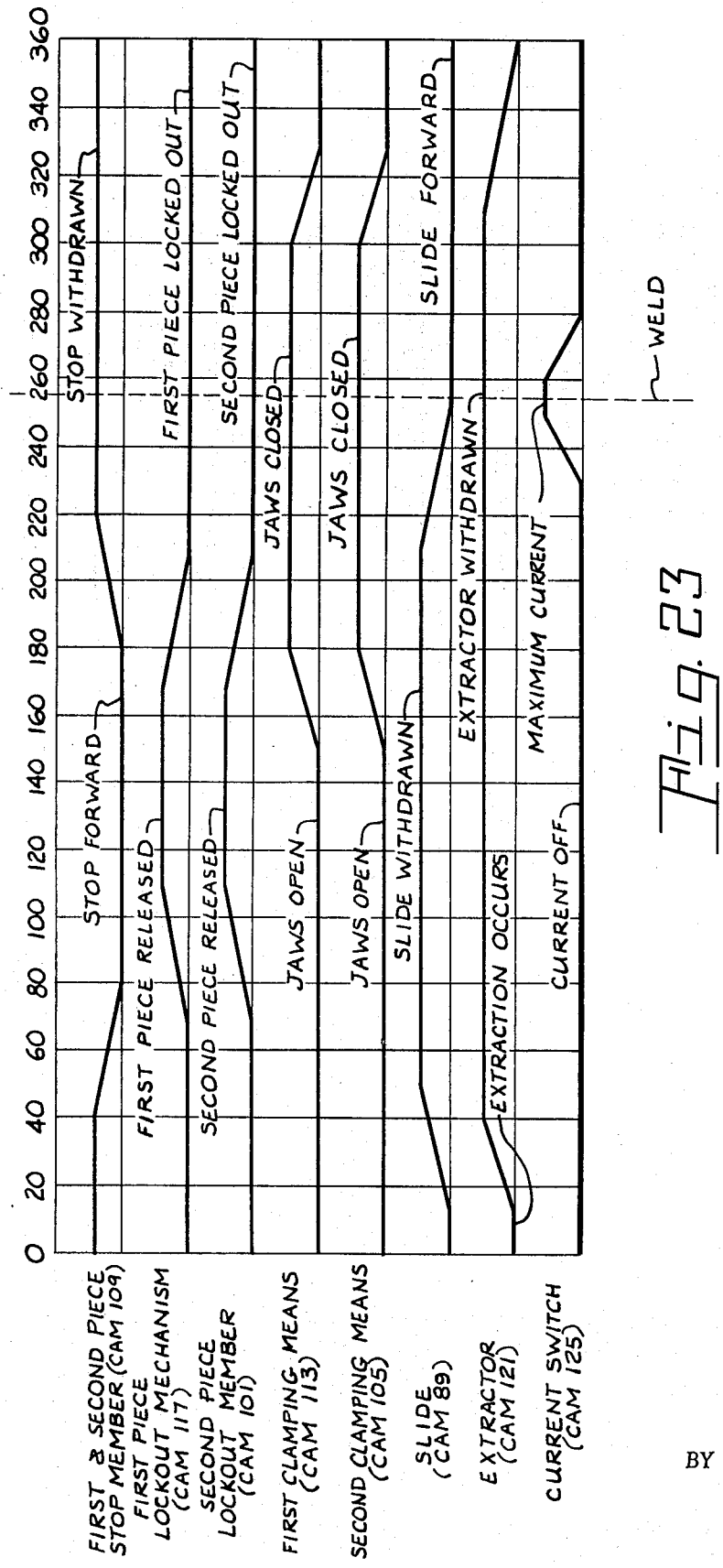
FIG. 23 is a cam chart for the present invention.

A chart showing the operations resulting from the cams at designated positions on their respective surfaces as measured in degrees is given in FIG. 23. By comparing vertically, the position of the various working components of the apparatus at a given time with respect to each other can be seen. The weld is shown as occurring between the 250° and 260° range.

While there have been shown what are presently considered the preferred embodiments of this invention, it is obvious to those skilled in the art that various changes and modifications may be made therein without departing from the scope of the invention as defined by the following claims.

What is claimed is:

1. An apparatus for producing a butt weld between first and second pieces of longitudinally aligned material, said apparatus comprising:

a stop means;

means for supplying a first one of said first pieces of material to a first side of said stop means;

a first clamping means for retaining said first one of said first pieces of material within said apparatus;

a first locking means positioned adjacent said first clamping means and adapted for prohibiting sequentually oriented first pieces of material from abutting said first one of said first pieces of material in said first clamping means;

means for supplying a first one of said second pieces of material to a second side of said stop means;

a second clamping means for retaining said first one of said second pieces of material within said apparatus;

a second locking means positioned adjacent said second clamping means and adapted for prohibiting sequentually oriented second pieces of material from abutting said first one of said second pieces of material in said second clamping means;

means for withdrawing said stop means from between said first ones of said first and second pieces of material;

means for moving said second clamping means whereby said first one of said second pieces of material contacts said first one of said first pieces of material;

means for supplying electric current to said first ones of said first and second pieces of material to butt weld said pieces;

means for ejecting said butt welded pieces of material from said apparatus; and coordination means for correlating the movements of said first and second clamping means, said means for withdrawing said stop means, said means for supplying electric current to said first ones of said first and second pieces, and said means for ejecting said butt welded pieces of material from said apparatus.

2. The apparatus according to claim 1 in which said means for supplying said first one of said first pieces of material to said first side of said stop means comprises a hollow tube member in which said first pieces of material are moved, said movement being substantially aided by a fluid pressure means, said fluid pressure means opening into said hollow tube member.

3. The apparatus according to claim 1 in which said first clamping means comprises a housing member having upper and lower jaws, each of said jaws having sliding portions located within said housing member and being moved by a link actuator member to engage said first one of said first pieces of material, said link actuator member in turn being driven by a moving arm member.

4. The apparatus according to claim 1 in which said means for supplying a first one of said second pieces of material to said second side of said stop means comprises a hollow tube member in which said second pieces of material are moved, said movement being substantially aided by a fluid pressure means, said fluid pressure means opening into said hollow tube member.

5. The apparatus according to claim 1 in which said second clamping means comprises a housing member having upper and lower jaws, each of said jaws having sliding portions located within said housing member and being moved by a link actuator member to engage said first one of said second pieces of material, said link actuator member in turn being driven by a moving arm member.

6. The apparatus according to claim 1 in which said means for withdrawing said stop means from between said first ones of said first and second pieces of material comprises a cam actuated follower arm, said follower arm being directly connected to said stop means.

7. The apparatus according to claim 1 in which said means for moving said second clamping means whereby said first one of said second pieces of material contacts said first one of said first pieces of material comprises a substantially longitudinally aligned slide member, said slide member joined to said second clamping means and being driven by a cam actuated linkage assembly.

8. The apparatus according to claim 1 in which said means for supplying electric current to said first one of said first and second pieces of material to butt weld said pieces comprises a potential source joined to said lower jaws of said housing members of said first and second clamping means, said potential source being cam actuated to sequentially supply said electric current according to the predetermined operating cycle of said apparatus.

9. The apparatus according to claim 1 in which said means for ejecting said joined pieces of material from said apparatus comprises a moving extractor arm, said extractor arm being joined to an intermediate arm member which in turn is driven by a cam actuated follower arm member.

10. The apparatus according to claim 1 in which said coordination means for correlating the movements of said first and second clamping means, said means for withdrawing said stop means, said means for supplying electric current to said first and second pieces, and said means for ejecting said joined pieces of material from said apparatus comprises a common rotating shaft having a plurality of cams positioned thereon for effecting said correlation of movements.

11. The apparatus according to claim 1 in which said first locking means comprises a movable limiter arm member which is sequentially actuated to periodically block said means for supplying said first pieces of material to a first side of said stop means.

12. The apparatus according to claim 1 in which said second locking means comprises a pair of opposed spring loaded gripping jaws, said jaws being sequentially actuated by a movable separator arm to periodically grip one of said second pieces of material.

13. The apparatus according to claim 1 in which there is provided a means for applying continued lateral pressure against said second clamping means to assure continued pressure intermediate said first ones of said first and second pieces of material when said electrical current is supplied said pieces.

* * * * *